United States Patent [19]

Akiba et al.

[11] Patent Number: 5,199,193
[45] Date of Patent: Apr. 6, 1993

[54] WORKING MACHINE

[75] Inventors: Masahiro Akiba; Shigeo Matsuyama, both of Tokyo, Japan

[73] Assignee: International Remote Corporation, Tokyo, Japan

[21] Appl. No.: 868,678

[22] Filed: Apr. 15, 1992

[30] Foreign Application Priority Data

| Dec. 26, 1991 | [JP] | Japan | 3-356813 |
| Jan. 30, 1992 | [JP] | Japan | 4-38317 |
| Jan. 30, 1992 | [JP] | Japan | 4-38318 |

[51] Int. Cl.$^5$ .............................................. E02F 3/32
[52] U.S. Cl. .................................. 37/341; 37/307; 37/313; 180/89.13; 180/326; 405/194; 410/1; 298/1 R
[58] Field of Search ............................... 37/54, 56, 71; 180/89.13, 326; 405/188, 189, 193, 194; 410/1; 298/1 R, 9, 17 R; 384/35

[56] References Cited

U.S. PATENT DOCUMENTS

| 1,598,992 | 9/1926 | Sullivan | 298/9 |
| 1,785,528 | 12/1930 | Rourke | 405/194 X |
| 2,174,956 | 10/1939 | Allison | 298/9 |
| 3,099,913 | 8/1963 | Melton et al. | |
| 3,105,453 | 10/1963 | Hayes | |
| 3,310,892 | 3/1967 | Spannhake et al. | 37/56 |
| 3,456,371 | 7/1969 | Graham et al. | |
| 3,620,579 | 11/1971 | Brown | 384/35 |
| 3,670,514 | 6/1972 | Breston et al. | |
| 3,683,521 | 8/1972 | Sloan et al. | 37/56 |
| 3,706,142 | 12/1972 | Brunner | 37/56 |
| 3,719,116 | 3/1973 | Burton et al. | |
| 3,719,403 | 3/1973 | Sung | 384/35 |
| 3,748,807 | 7/1973 | Sterner | 384/35 X |
| 3,751,120 | 8/1973 | Kietz | 384/35 X |
| 3,755,932 | 9/1973 | Cargile, Jr. | 37/56 X |
| 3,857,250 | 12/1974 | Di Tella et al. | |
| 3,892,079 | 7/1975 | Hirano et al. | 37/56 |
| 3,900,077 | 8/1975 | Gee et al. | 37/54 X |
| 3,978,679 | 9/1976 | Lecomte | 37/58 X |
| 3,983,707 | 10/1976 | Lezgintsev et al. | 37/56 |
| 4,010,619 | 3/1977 | Hightower et al. | 114/16 R X |
| 4,204,347 | 5/1980 | Wolters | 37/56 X |

FOREIGN PATENT DOCUMENTS

| 39716 | 1/1970 | Australia. | |
| 62009 | 4/1971 | Australia. | |
| 62010 | 4/1971 | Australia. | |
| 62011 | 4/1971 | Australia. | |
| 8302679 | 2/1985 | Netherlands | 37/54 |
| 1234085 | 6/1971 | United Kingdom. | |
| 2176153 | 12/1986 | United Kingdom. | |
| 2181040 | 4/1987 | United Kingdom. | |

*Primary Examiner*—Dennis L. Taylor
*Assistant Examiner*—Arlen Olsen
*Attorney, Agent, or Firm*—Lowe, Price, LeBlanc & Becker

[57] ABSTRACT

A working machine for use in a working system in which a pair of working machines, which are capable of traveling both on land and on a riverbed or the like, are respectively used for excavating gravel or the like on the bottom of the water and for transporting the same. The working machine is basically constructed such that an upper structure including an operator's cabin is mounted on a lower structure having a self-traveling mechanism, such as endless tracks, in such a manner that the heightwise position of the upper structure can be varied. The working machine is applied to a dredging machine for a shallow water area having an excavating mechanism juxtaposed in the vicinity of its upper structure, and to a transporting machine for a shallow water area having a load-carrying platform juxtaposed in the vicinity of its upper structure. The upper structure and the excavating mechanism, as well as the upper structure and the load carrying platform, are disposed in such a manner as to be capable of swiveling horizontally via a swivel base. The use of the dredging machine and the transporting machine improves the work efficiency.

14 Claims, 15 Drawing Sheets

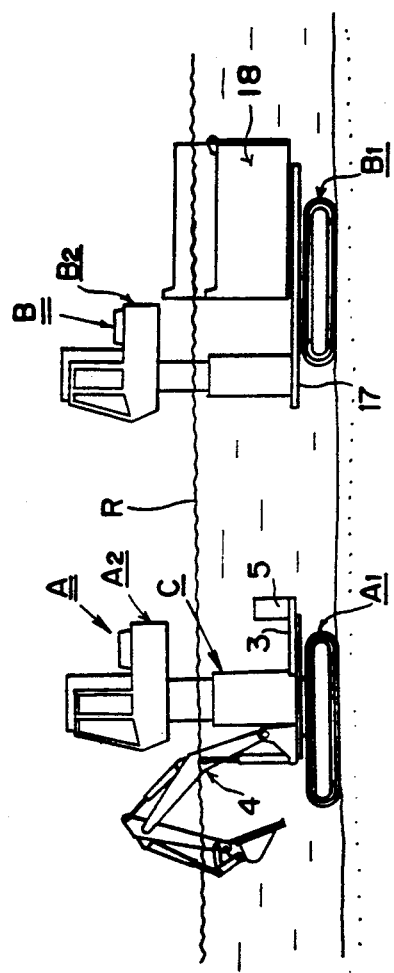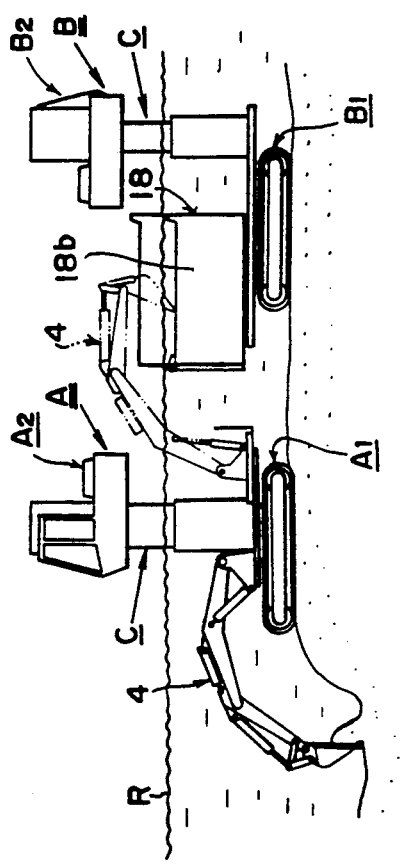

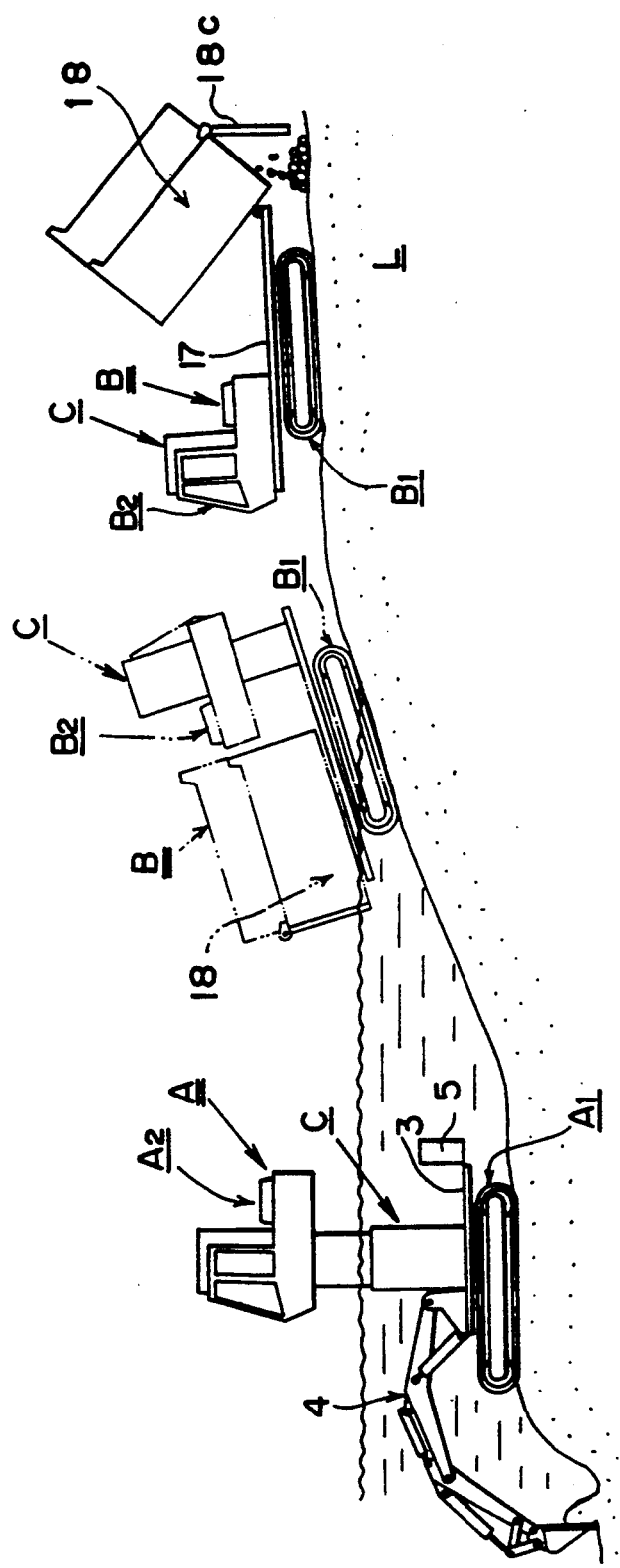

WORKING MACHINE

BACKGROUND OF THE INVENTION

1. Field of the Invention

The present invention relates to a working machine capable of improving the efficiency of a dredging operation on the bottom a shallow water area, such as a river, while maintaining safety in the operation.

2. Description of the Related Art

Conventionally, working machines capable of traveling both on land and on the bottom of the water, such as a riverbed, are known. The working machine of this type has an operator's cabin mounted at a position above a traveling means including a pair of endless tracks, for instance. In this cabin, the operator performs a predetermined controlling operation, thereby permitting the operation of an excavating means including a shovel, or other similar means.

However, even though the operator's cabin is located above the traveling means, in the case of a working machine in which the operator's cabin is located at a relatively low position, it is impossible to effect an operation in a river or the like whose depth of water is exceedingly large.

Accordingly, it is conceivable to render the heightwise position of the operator's cabin variable. However, working machines of a conventionally known type are arranged such that when the height of the operator's cabin is changed, a plurality of kinds of columns of varying lengths are provided in advance, and the column is replaced, as required, by an appropriate column prepared in correspondence with the depth of a river or the like, so as to change the height of the operator's cabin.

With this conventional type, in order to move the operator's cabin in the heightwise direction, it is necessary to replace the column with an appropriate one of the plurality of kinds of columns in correspondence with the depth of the river or the like. This replacement operation imposes a large burden on the operator since the weight of the operator's cabin including a power unit such as an engine is large.

In working machines of another type in which the column has a plurality of cylindrical pipes fitted one within another and is telescopically extended or retracted, the operator's cabin is lifted by an external device to set the telescopically extendible column to a desired heightwise position, and the column is then secured by means of bolts and nuts, lock pins, or the like.

Even with this conventional type in which the column is comprised of a plurality of tubular portions and is adapted to be telescopically extended or retracted in the longitudinal direction, if the machine is of a type in which the column itself cannot be automatically extended or retracted telescopically, the following drawback is encountered. That is, in order to set the operator's cabin and the power unit, such as the engine, from a state adapted for a land operation to a state adapted for an operation on the bottom of the water, or vice versa, it is necessary to lift them up by means of a separate crane or the like and then fix the column, with the result that the operation requires time and labor.

In addition, with the working machines of the above-described types, since not only the operator's cabin and the power unit but also a working boom with a bucket or the like and a balance weight are located in the upper position, the center of gravity becomes high during operations on the bottom of the water. As a result, there has been the drawback that the working machine is liable to become unstable.

To transport the dredged material, such as gravel, sand, and mud (hereinafter the dredged material will be simply referred to as the dredged gravel), excavated by the excavating means to land, the dredged gravel is generally stored temporarily on a barge or the like floating on water and adapted to transport the dredged gravel, and the barge is brought alongside the pier or the like to discharge the dredged gravel. In the operation of transporting the dredged gravel by using the barge, however, the barge carrying the dredged gravel stored temporarily thereon must reciprocate between the work site and the location where the barge is brought alongside the pier or the like. Then, the dredged gravel is discharged from the barge onto the land by using a separate shovel loader, crane, or the like. Thus the operating efficiency has been very poor.

In the operation of transporting the dredged gravel by means of the working machine capable of traveling on the bottom of the water, the direction of a traveling structure needs to be changed in correspondence with an operating condition when the dredged gravel excavated by the excavating means is discharged onto a load carrying platform, or when the dredged gravel is transported to the land. However, there frequently occur cases where the direction of the traveling structure is difficult to change on the bottom of the water owing to such conditions as the contours of the bottom of the water, the volume and velocity of flowing water, and so on. Hence, the operating efficiency has been very poor, and the danger involved in the operation has been large.

In the case of a working machine in which a load receiving means is juxtaposed to the operating cabin at a position above the traveling means, a predetermined position of the center of gravity of the entire working machine changes with an increase in the volume of gravel or the like loaded on the load receiving means. Hence, there has been the problem that the traveling stability becomes aggravated with an increase in the load.

SUMMARY OF THE INVENTION

Accordingly, an object of the present invention is to provide a working machine capable of efficiently performing predetermined operations such as the excavation and transportation of gravel or the like in a state in which the area of an operator's cabin is located above the water surface in a river or the like even if the depth of water is relatively large in a shallow water area.

Another object of the present invention is to provide a working machine which is capable of optimally controlling a variation in the position of the center of gravity of the working machine in correspondence with a change in the weight of the load such as gravel.

To these ends, the working machine in accordance with the present invention comprises a traveling lower structure capable of self traveling and an upper structure disposed above the traveling lower structure via a swivel base. The traveling lower structure has a traveling means capable of self-traveling by the rotative driving of endless tracks, for example, and the upper structure includes an operator's cabin for controlling the driving of the traveling means. The operator's cabin is so arranged as to be capable of being located above water in a river or the like whose depth of water is relatively large.

The above and other objects, features and advantages of the present invention will become more apparent from the following detailed description of the invention when read in conjunction with the accompanying drawings.

BRIEF DESCRIPTION OF THE DRAWINGS

FIGS. 16A, 16B, 17A, 17B, and 18 are diagrams illustrating the operation; and

DESCRIPTION OF THE PREFERRED EMBODIMENTS

Figure 1:
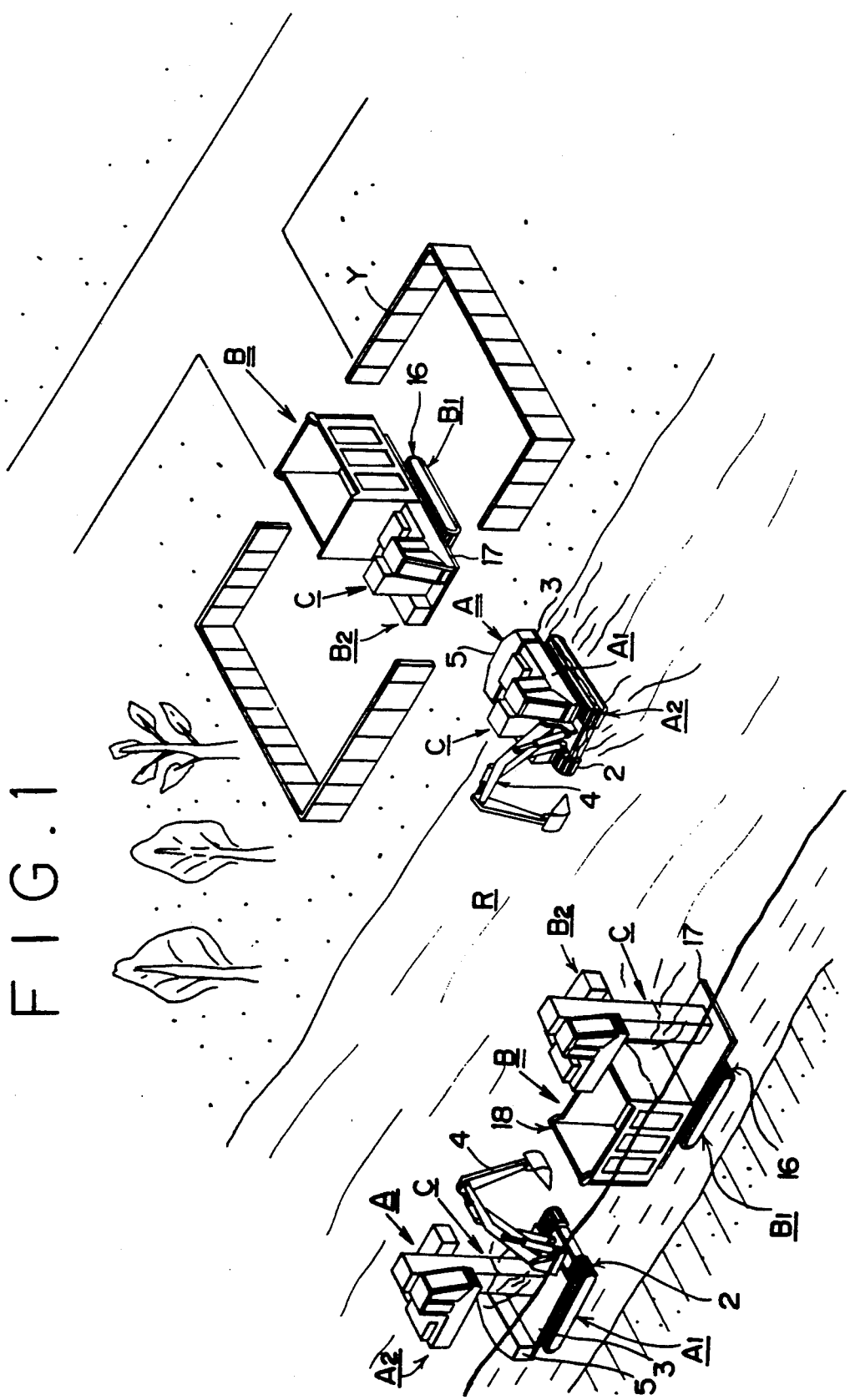
FIG. 1 is a perspective view illustrating how working machines in accordance with the present invention are applied in practice.

FIG. 1 depicts working (dredging) machines A for a shallow water area and transporting machines B for a shallow water area, which are illustrated as working machines in accordance with the present invention.

Figure 2:
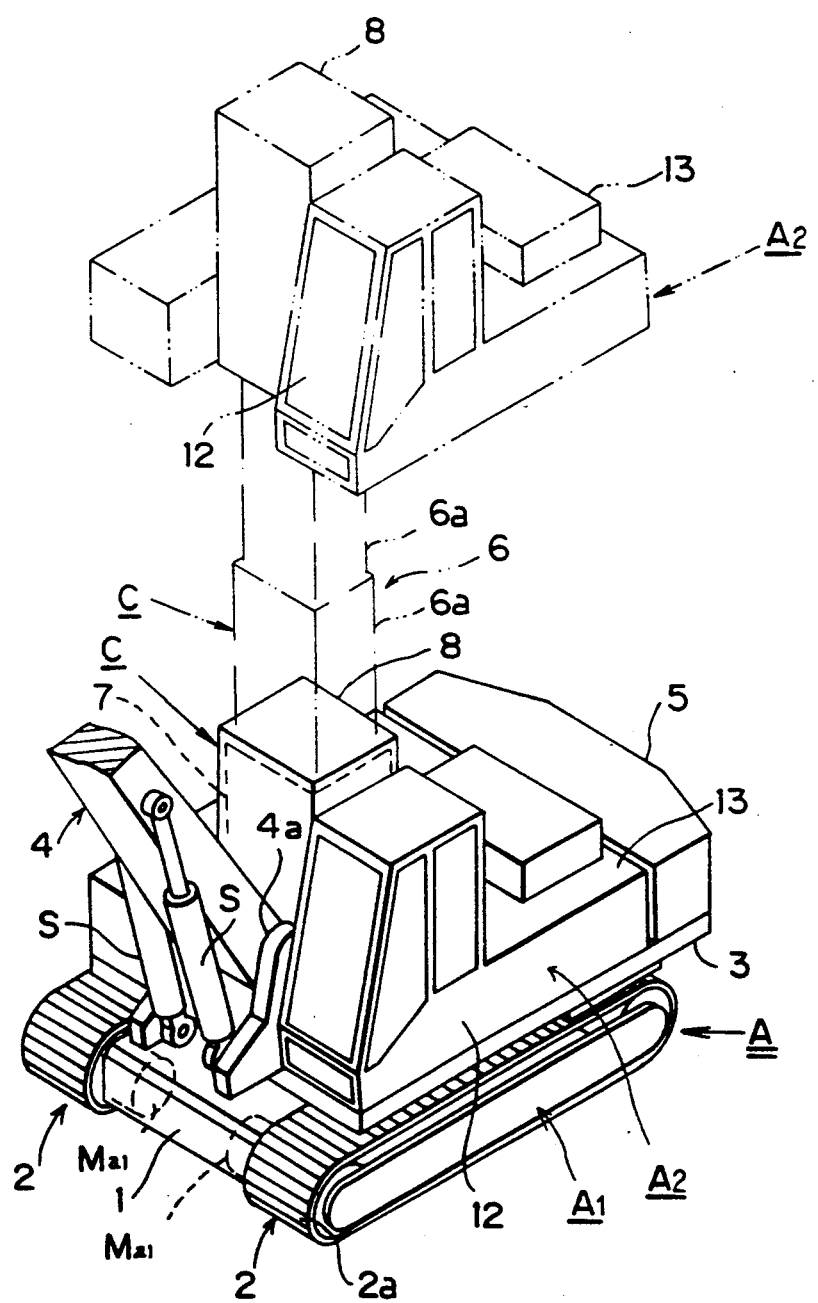
FIG. 2 is a perspective view of a working machine for a shallow water area.
Figure 3:
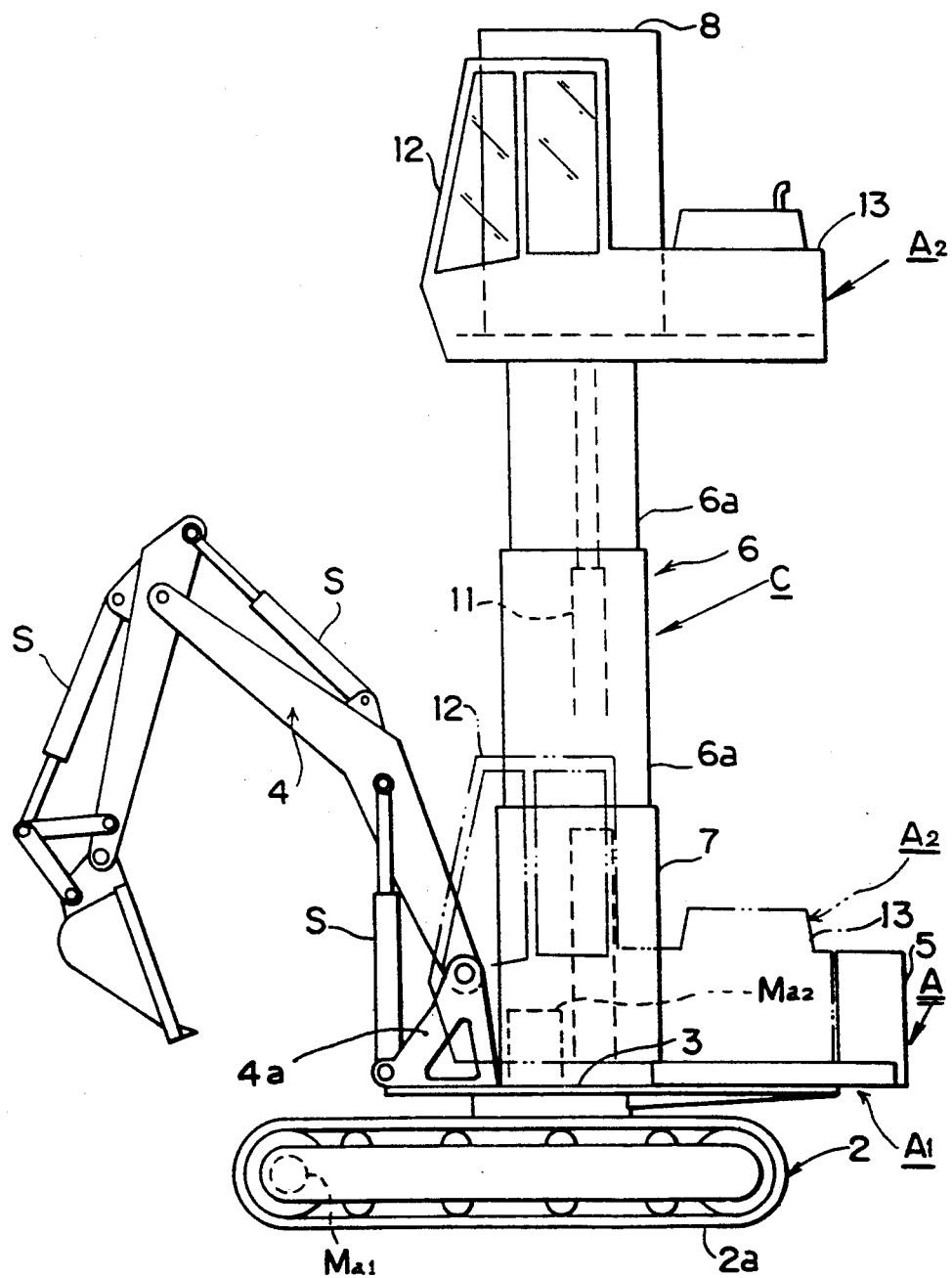
FIG. 3 is a side elevational view of FIG. 2.
Figure 11:
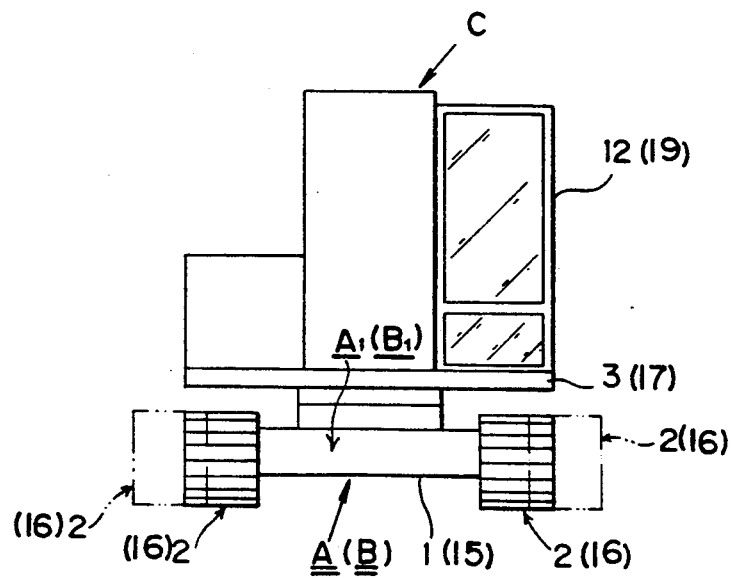
FIG. 11 is a diagram illustrating how endless-track traveling units are extended relative to each other in a transverse direction.

Working machine A for a shallow water area, as depicted in FIGS. 1 to 3, comprises a traveling base 1 having a plate-like or frame-like configuration provided with a pair of endless-track traveling units 2 disposed on opposite sides thereof and serving as a traveling means. The endless-track traveling units 2 are arranged to be rotatable via a pair of traveling hydraulic motors $Ma_1$ mounted in the traveling base 1, respectively. Specifically, the endless-track traveling units 2 are adapted to travel as a pair of endless tracks $2a$ rotatively driven by the traveling hydraulic motors $Ma_1$. As depicted in FIG. 11, the endless-track traveling units 2 are capable of moving in the transverse direction relative to each other, as required, to set the distance between the endless-track traveling units 2 to a desired dimension.

As depicted in FIG. 3, a plurality of hydraulic cylinders S for a boom are mounted on articulated portions of a working boom 4 (excavating means), so that the working boom 4 can be bent to a desired state by means of the hydraulic cylinders S for the boom.

Figure 4:
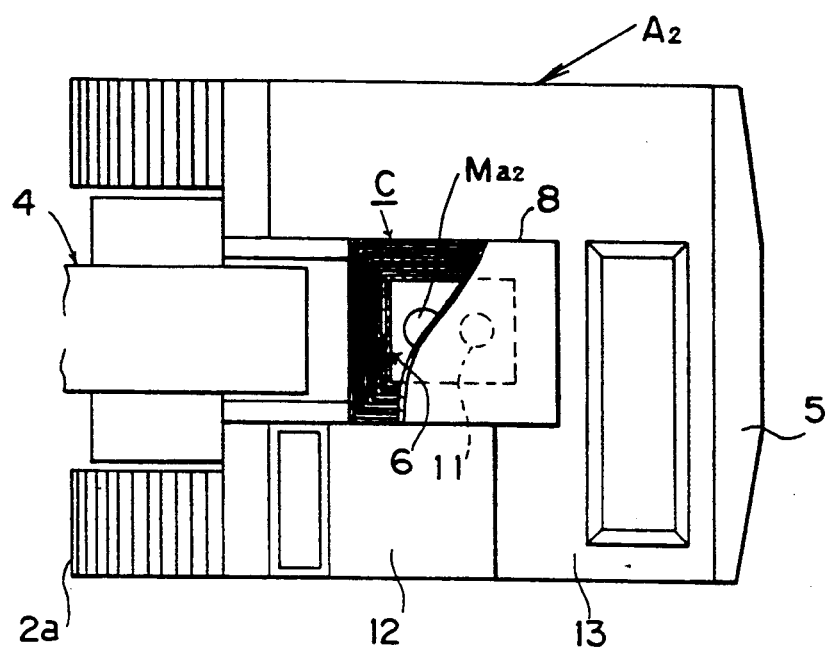
FIG. 4 is a plan view of FIG. 2.
Figure 5:
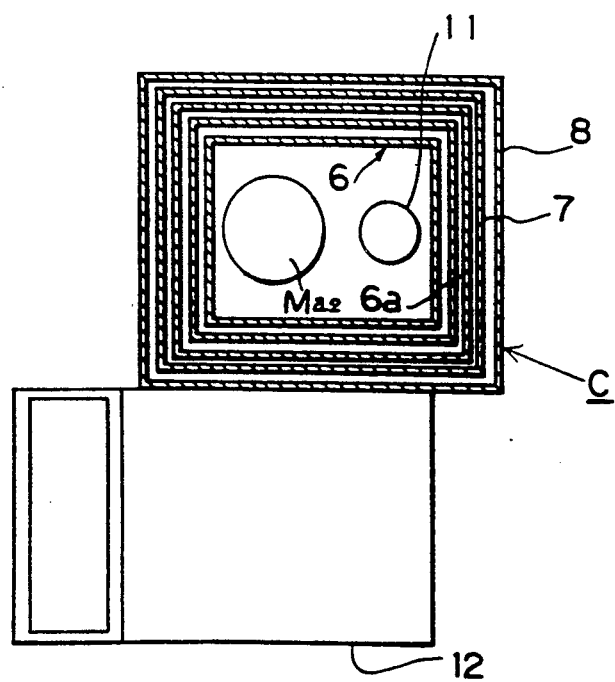
FIG. 5 is a horizontal cross-sectional view of an extending and retracting body.

A traveling lower structure $A_1$ is provided with a swivel base 3 which swivels in a horizontal plane on the traveling base 1. The working boom 4 and a weight 5 are disposed on the swivel base 3, the working boom 4 being mounted on a base $4a$ for pivotally supporting the boom. In FIGS. 4 and 5, the swivel base 3 is swiveled by a motor $Ma_2$ used exclusively for swiveling and disposed on the traveling base 1, and the arrangement provided is such that the working boom 4 and the weight 5 move as the swivel base 3 swivels.

An extending and retracting body C is comprised of an extending and retracting section 6, a lower tubular column 7, and a top tube 8. The extending and retracting section 6 has a plurality of tubes $6a$ whose outside dimensions are slightly different to allow the tubes $6a$ to be inserted into each other and telescopically fitted one within another.

Figure 6:
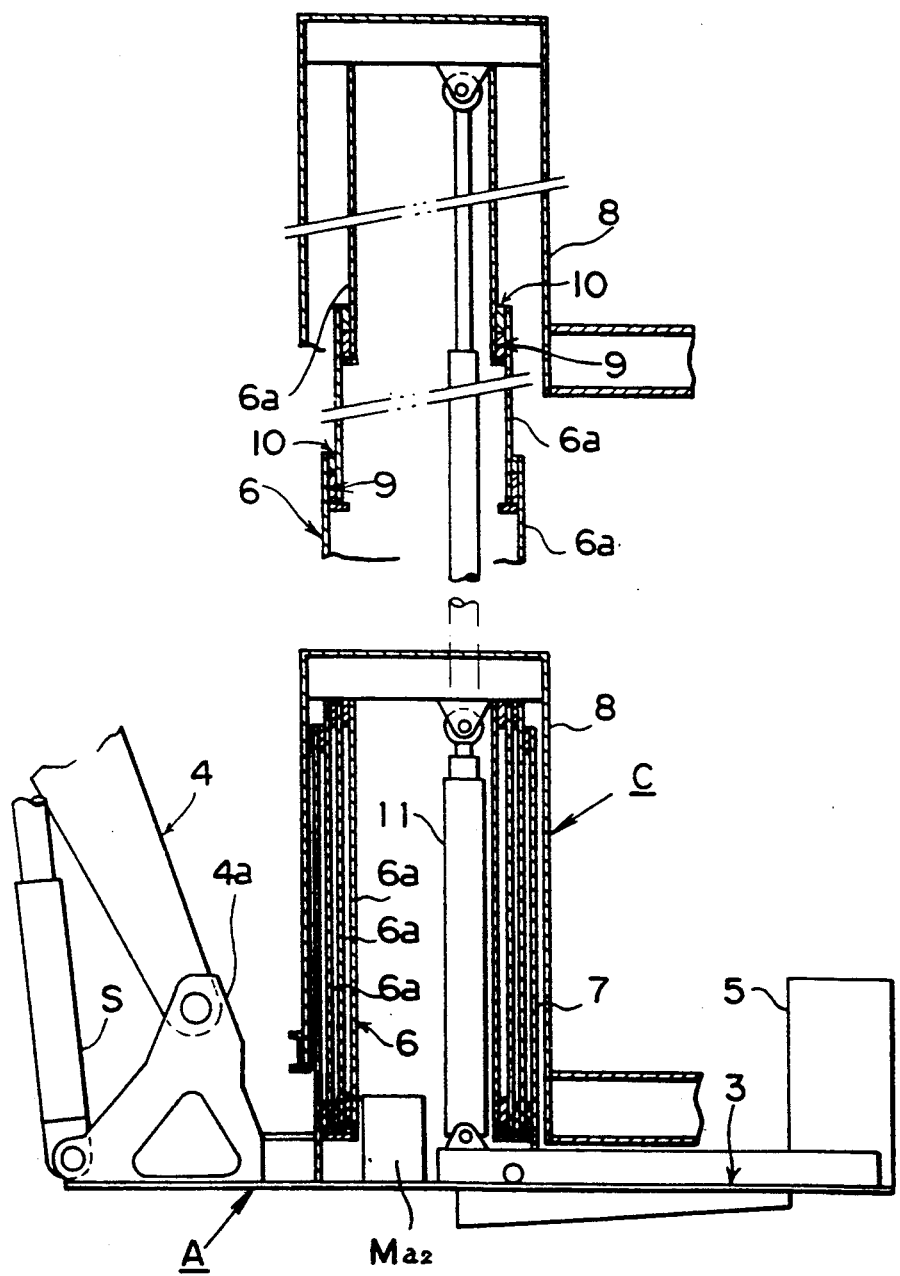
FIG. 6 is a vertical cross-sectional view of essential portions of the extending and retracting body.

More specifically, the arrangement provided is such that, as depicted in FIGS. 5 and 6, the tubes $6a$ having different sizes are fitted one within another and are capable of being telescopically extended, and the extending and retracting section 6 having the plurality of tubes $6a$ are capable of being accommodated in the lower tubular column 7 fixed on the swivel base 3.

As specific configurations of the tubes $6a$ constituting the extending and retracting section 6, as well as the lower tubular column 7 and the top tube 8, it is possible to cite those having polygonal or rectangular cross sections (FIG. 4).

In FIG. 5, the outside dimension of the lower tubular column 7 is made slightly larger than the outside dimension of the tube $6a$ of a maximum size so that the tubes $6a$ fitted one within another in a retracted state can be accommodated in the lower tubular column 7. The top tube 8 is mounted on top of the innermost one of the tubes $6a$, i.e., the tube $6a$ which is brought to the highest position when the extending and retracting section 6 is fully extended. The top tube 8 is in the form of a cap (FIG. 6) with a rectangular cross section, and is arranged to cover the plurality of tubes $6a$ in the retracted state and the lower tubular column 7 and accommodating the same therein.

Figure 10A:
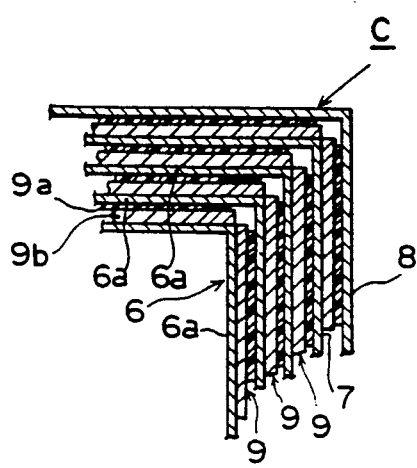
FIG. 10A is a horizontal cross-sectional view of essential portions of the extending and retracting body.
Figure 10B:
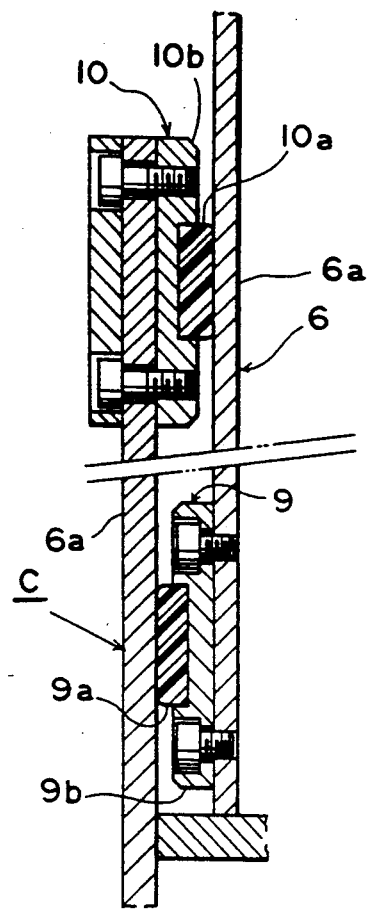
FIG. 10B is an enlarged cross-sectional view of a sliding portion and a terminating portion of the extending and retracting body.

As depicted in FIGS. 10A and 10B, in the extending and retracting body C, a belt like sliding portion 9 is secured to each outer side surface of the respective tube $6a$ at a lower end thereof in the extending and retracting section 6. Meanwhile, a terminating portion 10 is secured to each inner side surface of the respective tube $6a$ at an upper end thereof. Each sliding portion 9 is arranged such that a sliding piece $9a$, which is provided with surface treatment with such as Teflon ("Teflon" is the trademark for polytetrafluoroethylene) to make the surface thereof smooth, is secured to the surface of a base $9b$. The sliding portions 9 are capable of preventing the adjacent ones of the tubes $6a$ fitted one within another from being brought into direct contact with each other, thereby preventing frictional resistance from increasing when the extending and retracting section 6 undergoes extending or retracting motion. As a result, the sliding portions 9 serve to improve the condition of sliding between the adjacent ones of the tubes 6a fitted one within another.

Meanwhile, the terminating portion 10 is similarly secured to each inner side surface of the lower cylindrical column 7 at an upper end thereof. Hence, as corresponding ones of the sliding portions 9 and terminating portions 10 of the tubes 6a as well as terminating portions 10 of the lower tubular column 7 are brought into contact with each other, it is possible to prevent the extending and retracting section 6 from being removed from the lower tubular column 7 or prevent the tubes 6a of the extending and retracting section 6 from being extended excessively.

In terms of its configuration, the terminating portion 10 is arranged in the same way as the sliding portion 9. Specifically, in FIG. 10B, a sliding piece 10a is secured to a base 10b. The sliding portions 9 and the terminating portions 10 constitute a friction absorbing means.

A hydraulic cylinder 11 for extension and retraction is mounted interiorly of the tubes 6a of the extending and retracting section 6. As depicted in FIGS. 3 to 6, the hydraulic cylinder 11 is disposed vertically inside the tubes 6a and the lower tubular column 7 in such a manner that a lower fixed end of the hydraulic cylinder 11 for extension and retraction is fixed on the swivel base 3, and an upper free end of the hydraulic cylinder 11 is secured to the top tube 8. As the hydraulic cylinder 11 extends or retracts, the extending and retracting body C is extended or retracted.

An upper structure $A_2$ including an operator's cabin 12 and a power unit 13, such as a diesel or gasoline engine, is secured to the top tube 8. When the extending and retracting body C is extended upward, only the upper structure $A_2$ secured to the top tube 8 is moved upwardly of the swivel base 3 of the lower structure $A_1$. The operator in the operator's cabin 12 can freely control the power of the traveling hydraulic motors $Ma_1$ and the hydraulic cylinders S for the boom. In addition, the upper structure $A_2$ makes it possible to cause the lower structure $A_1$ to travel at a desired speed and control the working boom 4 to a desired state of operation.

The power unit 13 serves to supply a fluid, such as hydraulic oil, to the traveling hydraulic motor $Ma_1$, the hydraulic cylinders S for the boom, the hydraulic cylinder 11 for extension and retraction, and the like via a hydraulic pump.

The working boom 4 and the weight 5 are secured on the swivel base 3 of the lower structure $A_1$. In a state in which the extending and retracting body C is extended, only the upper structure $A_2$ is located at a high position after being raised. The working boom 4 and the weight 5 are secured at a level equivalent to that of the swivel base 3, so that the movement of the center of gravity of the entire working machine A for a shallow water area can be minimized. Since the working boom 4 is secured on the swivel base 3 of the lower structure $A_1$ and is not raised like the upper structure $A_2$, the working boom 4 is capable of effecting excavating operations at a low position, and can be set in a state substantially similar to that on the land.

Figure 12:
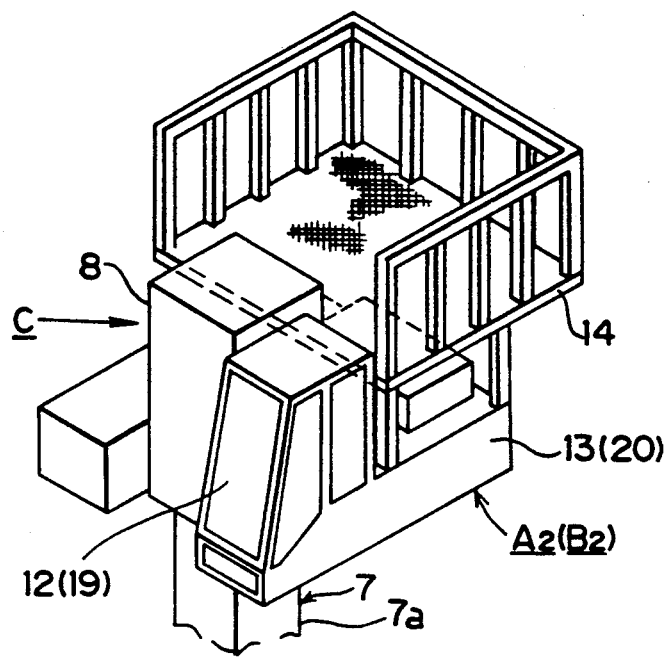
FIG. 12 is a perspective view illustrating an example in which a deck is mounted on an upper structure.

As depicted in FIG. 12, the upper structure $A_2$ may be provided with a deck 14. Specifically, the deck 14 is mounted on the power unit 13 of the upper structure $A_2$ and is located above water together with the upper structure $A_2$, as depicted in FIG. 13A. The deck 14 is used to allow the operator to take necessary actions concerning the work or for purposes of emergency evacuation or the like.

Figure 7:
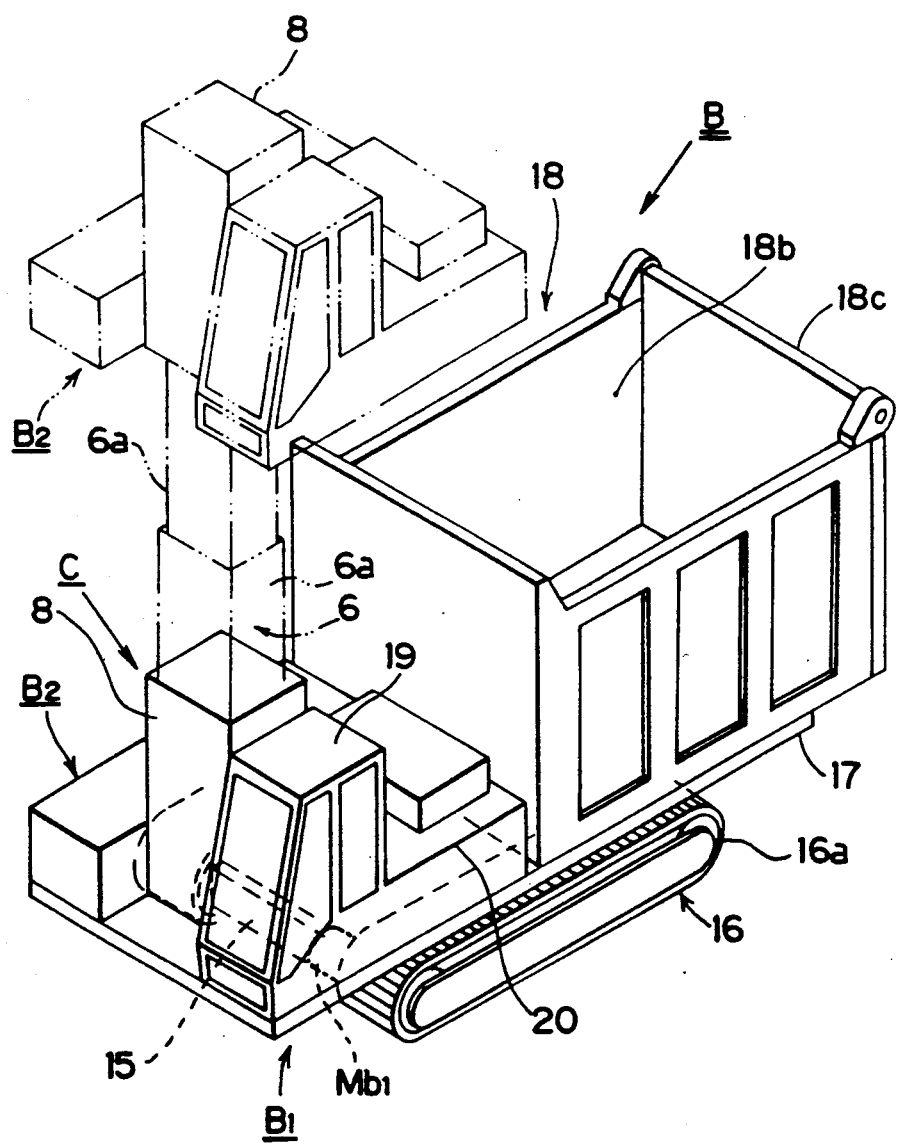
FIG. 7 is a perspective view of a transporting machine for a shallow water area.

Next, a description will be given of a transporting machine B for a shallow water area. As depicted in FIG. 7, the transporting machine B for a shallow water area comprises a traveling lower structure $B_1$ including a traveling base 15 and a swivel base 17; an upper structure $B_2$ including an operator's cabin 19 and the like; and an extending and retracting body C capable of being freely extended and retracted. The traveling lower structure $A_1$ and upper structure $A_2$ of the transporting machine B for a shallow water area are constructed in a manner substantially similar to those of the above described working machine A for a shallow water area, and the extending and retracting body C of the former machine is identical to that of the latter machine.

The lower structure $B_1$ is of a self-traveling type. As depicted in FIG. 7, the lower structure $B_1$ is provided with a pair of endless-track traveling units 16 disposed on transversely opposite sides of the traveling base 15 having power sources for traveling. The lower structure $B_1$ is adapted to travel as a pair of endless tracks 16a of the endless-track traveling units 16 are rotatively driven by a pair of traveling hydraulic motors $Mb_1$ incorporated in the traveling base 15, respectively. The distance between the endless-track traveling units 16 can also be set to a desired dimension as in the case of the working machine A for a shallow water area (see FIG. 11).

Figure 9:
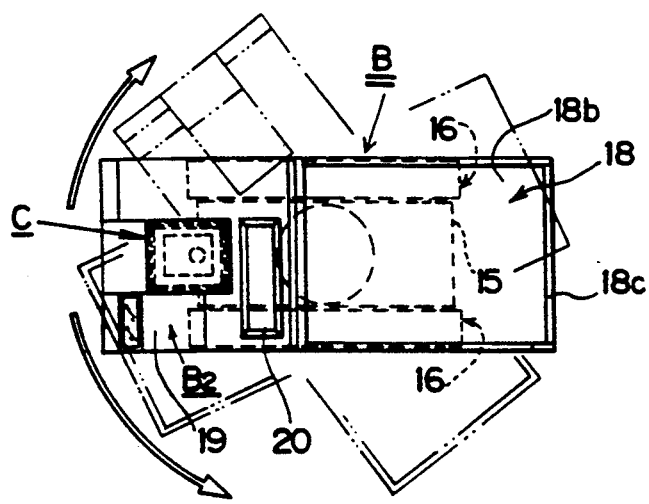
FIG. 9 is a plan view of FIG. 7.

The swivel base 17 is swiveled in a horizontal plane on the traveling base 15 by means of a motor $Mb_2$ used exclusively for swiveling. As depicted in FIG. 9, as the swivel base 17 swivels, a load-carrying platform 18 having a box shape and serving as a load-carrying means, as well as the upper structure $B_2$, are capable of changing their positions in the horizontal plane.

Figure 8:
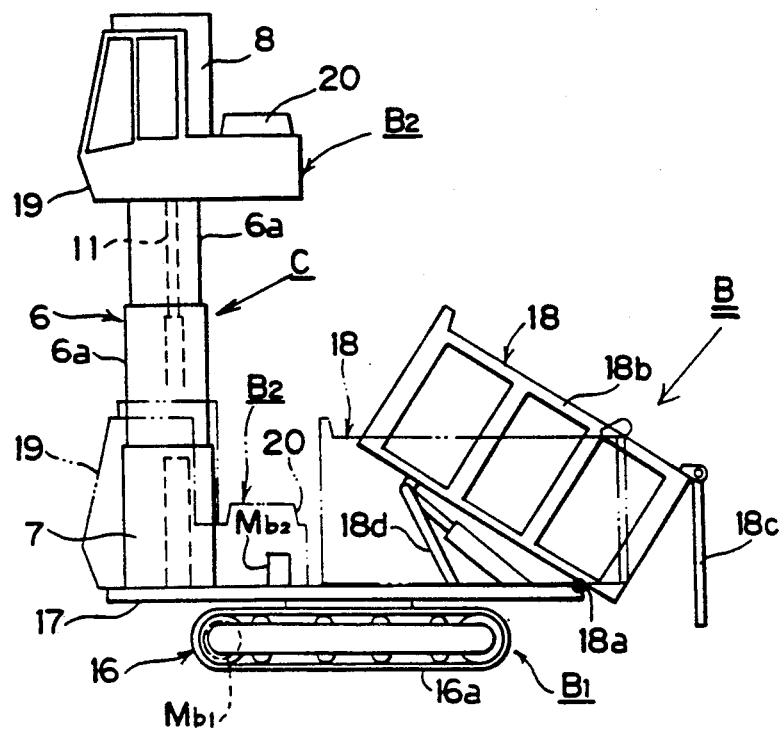
FIG. 8 is a side elevational view of FIG. 7.

As depicted in FIG. 8, the load-carrying platform 18 is so structured as to effect a tilting operation with a pivotal point 18a at a rear end thereof serving as a fulcrum by means of a load-carrying-platform tilting device 18d. By virtue of this arrangement, the dredged gravel temporarily stored on the load-carrying platform 18 can be easily discharged on land. Specifically, the load-carrying platform 18 is comprised of a load-receiving section 18b and a load-discharging cover 18c disposed at a rear end thereof. As the load-carrying platform 18 is tilted, the load-discharging cover 18c is opened to allow the dredged gravel to be discharged.

Figure 13:
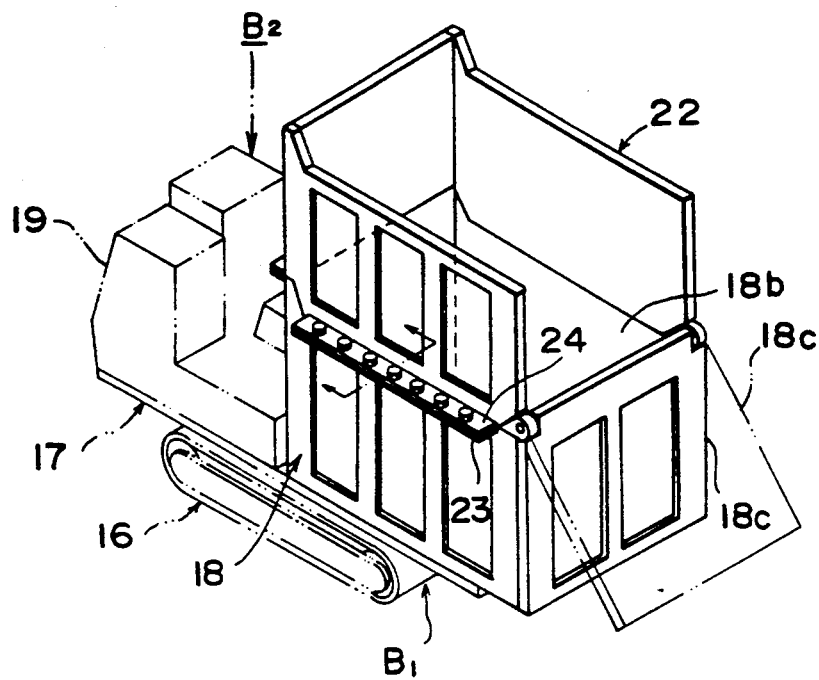
FIG. 13 is a perspective view of a case in which an auxiliary member is provided on a load-carrying platform of the transporting machine for a shallow water area.
Figure 14A:
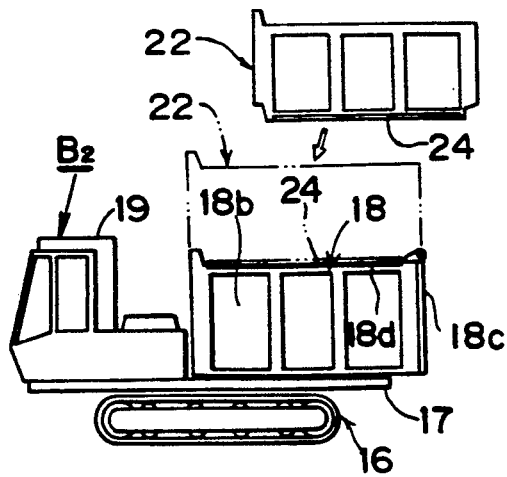
FIG. 14A is a side elevational view thereof.
Figure 14B:
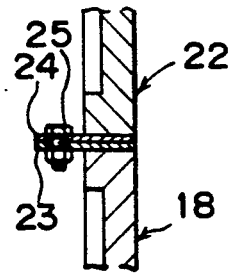
FIG. 14B is an enlarged cross-sectional view of an essential portion and illustrates a coupling portion of the auxiliary member.

As depicted in FIGS. 13, 14A, and 14B, the load-carrying platform 18 is detachably provided with an auxiliary side plate assembly 22, as necessary. That is, mounting flanges 23 are formed on the upper ends of the side plates of the platform 18, while auxiliary flanges 24 are formed on the auxiliary side plate assembly 22. The auxiliary side plate assembly 22 is mounted on the platform 18, as depicted in FIG. 14A, such that the mounting flanges 23 and the auxiliary flanges 24 abut against each other and are secured to each other through fixing means 25 such as bolts and nuts (FIG. 14B).

The extending and retracting body C has the same construction as that of the above described working machine A for a shallow water area, and the upper structure $B_2$ is capable of moving vertically by means of the extending and retracting body C. Specifically, the upper structure $B_2$ is mounted on the top tube 8 constituting a part of the extending and retracting body C. As depicted in FIG. 7, when the extending and retracting body C is extended upward, only the upper structure $B_2$ secured to the top tube 8 is capable of moving upwardly of the swivel base 17 of the lower structure $B_1$.

The upper structure $B_2$ is provided with the operator's cabin 19 and a power unit 20 such as a diesel or gasoline engine, and the operator in the operator's cabin 19 can freely control the traveling speed by means of the traveling hydraulic motor $Mb_1$ as well as the operation for changing the transverse distance between the endless-track traveling units 16, as required. Furthermore, the platform 18 can be tilted by means of the load-carrying-platform tilting device $18d$ to effect the discharging operation.

The power unit 20 serves to supply a fluid, such as hydraulic oil, to the traveling hydraulic motor $Mb_1$, the hydraulic cylinder 11 for extension and retraction, and the like via a hydraulic pump.

Figure 15A:
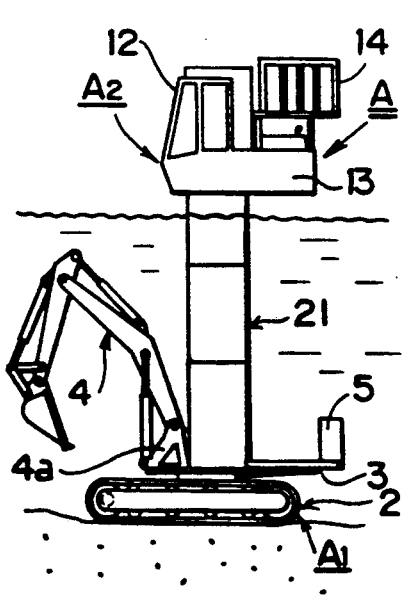
FIGS. 15A and 15B illustrate another embodiment in which the upper structures of the working machine and the transporting machine are supported by columns, respectively.
Figure 15B:
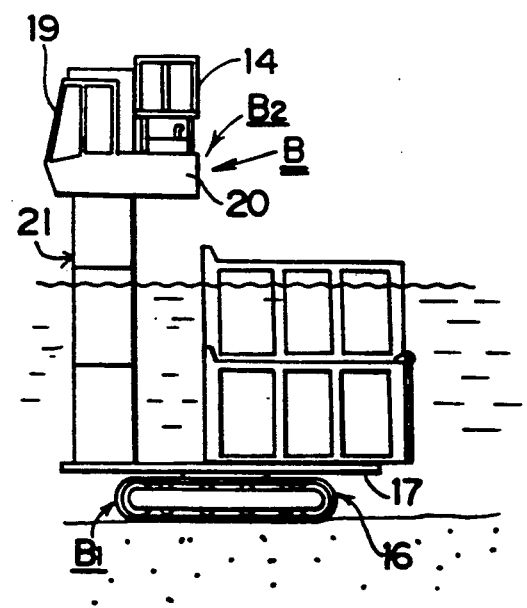

FIGS. 15A and 15B are illustrations of another embodiment in which a column 21 is used instead of the extending and retracting body C for raising and lowering the upper structure $A_2$ or $B_2$. The column 21 has such a predetermined fixed length that allows the upper structure $A_2$ or $B_2$ to be located above water in correspondence with the depth of the water in the river or the like. In operation, only one column 21 of the predetermined length may be used, or a plurality of columns 21 may be used by being connected together, particularly in cases where the depth of water is large.

The upper structure $B_2$ of the transporting machine B for a shallow water area may also be provided with the deck 14 as in the case of the working machine A for a shallow water area. As depicted in FIG. 15B, the deck 14 is mounted on the power unit 20 so as to allow the operator to take necessary actions concerning the work or for purposes of emergency evacuation or the like.

Figure 16A:
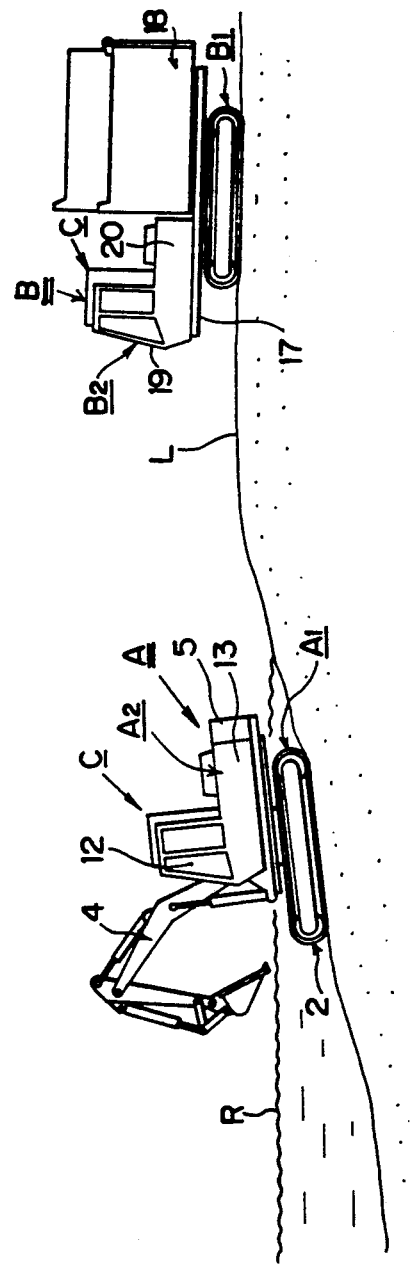

In the present invention, the working machine A for a shallow water area and the transporting machine B for a shallow water area are used to excavate the bottom of the water in a river or the like and transport the dredged gravel onto the land, respectively. A description will be given of this system with reference to FIGS. 1 and 16A, 16B, 17A, 17B, and 18. First, as depicted in FIG. 1, a stockyard Y is provided on land L, and as depicted in FIG. 16A, both the working machine A and the transporting machine B move from land L to the bottom of a river R along the slope.

In a case where the working machine A and the transporting machine B are provided with the extending and retracting bodies C, the upper structures $A_2$ and $B_2$ are raised to be located above the water while the extending and retracting bodies C are being extended in correspondence with the depth of water of the river R. Alternatively, in a case where the columns 21 are used instead of the extending and retracting bodies C, the columns 21 corresponding to the depth of the water are mounted in advance on the working machine A and the transporting machine B to allow the upper structures $A_2$ and $B_2$ to be located above the water.

Upon arrival at the work site, as depicted in FIG. 17A, the working machine A and the transporting machine B are stopped, the working machine A starts the operation of excavating the riverbed, and discharges the dredged gravel onto the platform 18 of the working machine B, as indicated by the two dotted chain lines in FIG. 17B.

Here, with this type of transporting machine B which is provided with the swivel base 17, the positions of the upper structure $B_2$ and the platform 18 can be changed simply by causing only the swivel base 17 of the lower structure $B_1$ to swivel (FIG. 17B). Since the swivel base 17 of the transporting machine B is swiveled in the rear of the working machine A, as described above, the transporting machine B can be set in such a position that the operation of discharging onto the platform 18 by the working boom 4 of the working machine A is facilitated. Thus, the operation of discharging the dredged gravel from the working machine A can be performed efficiently.

When the platform 18 of the transporting machine B becomes fully loaded with the gravel, only the transporting machine B is moved to the land L (FIG. 18), to discharge the dredged gravel at the stockyard Y (see FIG. 1), and the transporting machine B is moved again to the work site after discharging. This procedure is repeated, as required, to effect the dredging and transporting operations.

Figure 19:
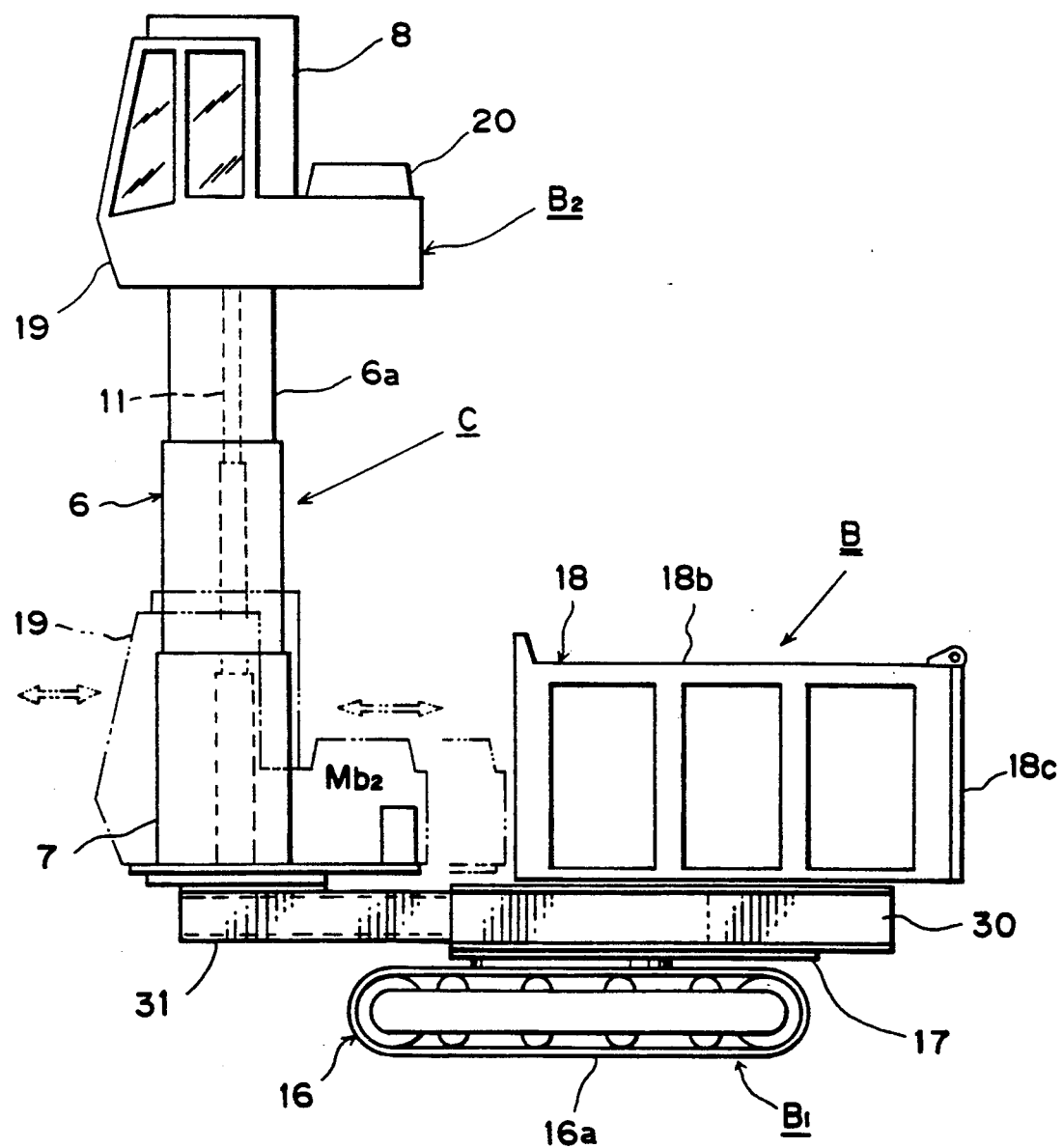
FIGS. 19 and 20 are a side elevational view and a perspective view, respectively, illustrating still another embodiment of the transporting machine for a shallow water area.
Figure 20:
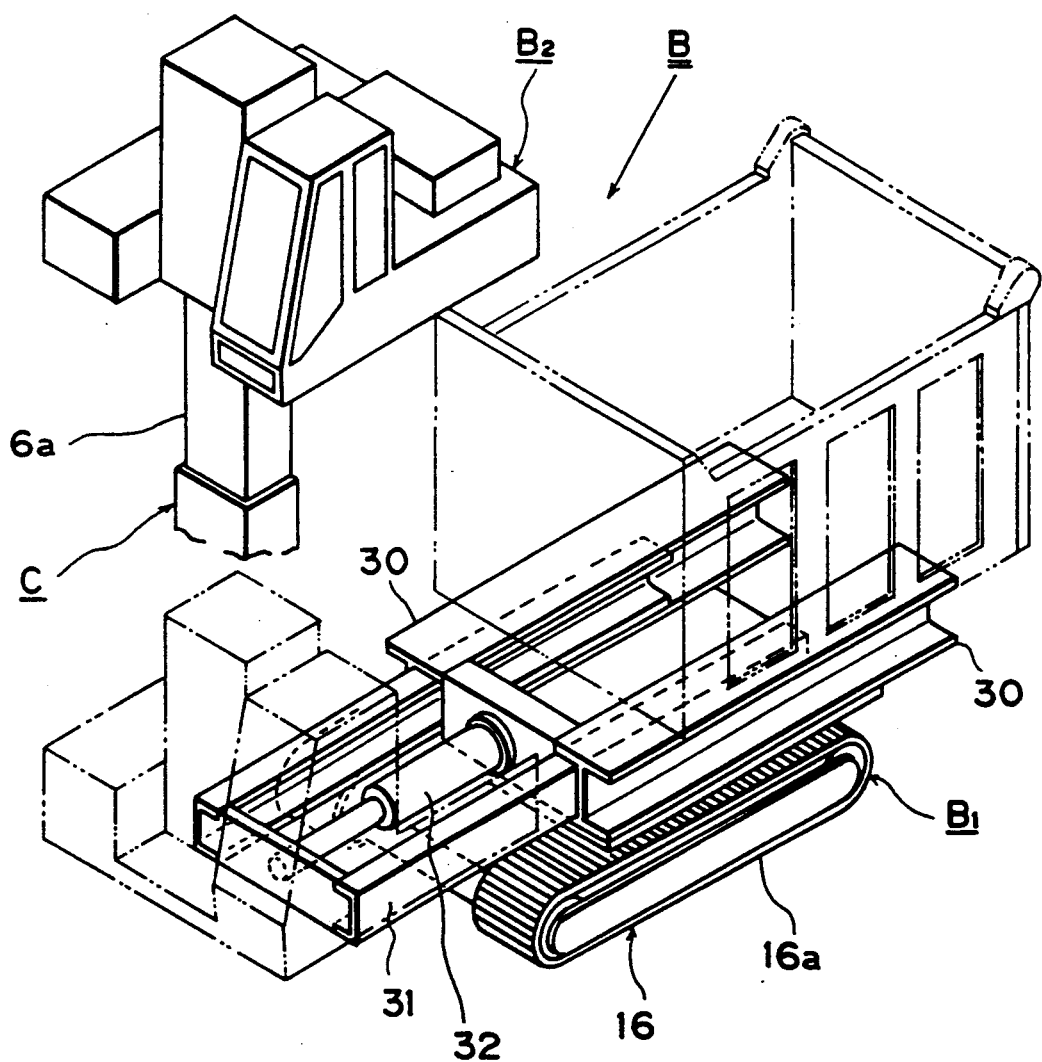

Next, a description will be given of still another embodiment of the present invention with reference to FIGS. 19 and 20. This embodiment is characterized by the fact that a positional change in the center of gravity of the transporting machine B for a shallow water area can be controlled as practically as possible.

That is, the platform 18 is disposed on upper surfaces of a pair of guide rails 30 constituting a guide and positioned in parallel with each other on an upper surface of the swivel base 17. A moving member 31 which is disposed in such a manner as to be capable of advancing or retracting along the guide rails 30 is connected to the left-hand side, as viewed in FIG. 19, of the guide rails 30. The moving member 31 is connected to a free end of a hydraulic cylinder 32 disposed between the guide rails 30, and is capable of advancing or retracting by means of the cylinder 32.

The upper structure $B_2$ is supported on the moving member 31, and is moved forward in correspondence with the volume of load on the platform 18. By virtue of this movement, a positional change in the center of gravity of the transporting machine B due to an increase in loadage can be controlled as practically as possible. It should be noted here that the guide rails 30, the moving member 31, and the cylinder 32 constitute a relatively moving means. The other arrangements are substantially the same as those of the foregoing embodiments.

As described above, the operations of excavating and transporting gravel are respectively effected by using the working machine A for a shallow water area and the transporting machine B for a shallow water area. The working machine A is arranged such that the self-traveling lower structure $A_1$ is provided with the working boom 4, the upper structure $A_2$ is disposed above the lower structure $A_1$ via the extending and retracting body C or the column 21, and the lower structure $A_1$ and the working boom 4 can be made controllable by the upper structure $A_2$. The transporting machine B is arranged such that the load-carrying platform 18 is provided on the lower structure $B_1$, the upper structure $B_2$ is disposed above the lower structure $B_1$ via the extending and retracting body C or the column 21, and the lower structure $A_1$ can be made controllable by the upper structure $A_2$. According to this arrangement, various advantages can be offered in that, first, the dredging operation on the bottom of the water in a river or the like can be effected very efficiently; second, the equipment used in the dredging operation can be minimized; and, third, safety in the dredging operation can be ensured.

The above-described advantages will be described hereafter in greater detail. The working machine A is provided with the working boom 4 capable of excavating the bottom of the water, while the transporting machine B is provided with the platform 18. By simultaneously using the working machine A and the transporting machine B in combination, the dredged gravel excavated by the working boom 4 of the working machine A can be immediately discharged onto the platform 18 of the transporting machine B, and the transporting machine B fully loaded with the dredged gravel moves in that state to the land L. Thus the work can be effected efficiently.

Furthermore, the working machine A and the transporting machine B have their upper structures $A_2$, $B_2$ located above water by means of the extending and retracting body C or the column 21, and the traveling of the lower structures $A_1$ $B_1$ can be controlled from the upper structures $A_2$, $B_2$. Hence, there are advantages in that the operator can engage in operations substantially in the same way as on land, and that the confirmation of safety can be effected easily.

On the other hand, in the conventional dredging operations, in a case where a barge capable of storing the dredged gravel is used, it is necessary to lift the dredged gravel above the water surface by means of a working boom and to discharge the same onto the barge. Hence, not only does this entail a large waste of working time, but there is the disadvantage of spilling the dredged gravel midway. In addition, when the barge fully loaded with the dredged gravel is brought alongside the pier or the like, the gravel is discharged onto the land by means of a separate crane. Consequently, there have been disadvantages that the number of working processes increases, and that the waste of working time increases as a result. These disadvantages are advantageously overcome by the present invention.

In the present invention, the excavation and the transportation of the dredged gravel can be effected only by the use of the working machine A and the transporting machine B. In contrast, it has conventionally been necessary to secure, in addition to the excavating machine, a place where the barge for storing the dredged gravel can be brought alongside the pier or other similar facilities. In addition, a crane for moving the dredged gravel onto the land L has been necessary. If a comparison is made in this aspect, the dredging work can be commenced promptly in accordance with the present invention, so that there is an advantage in that the period of work can be reduced and a reduction in the cost of work becomes possible.

Although the upper structure $A_2$ of the working machine A and the upper structure $B_2$ of the transporting machine B are located above water, the working boom 4 of the working machine A and the load-carrying platform 18 of the transporting machine B are constantly located in the vicinity of the bottom of the water. Hence, the dredging operation can be effected at low positions of the working machine A and the transporting machine B, so that both the working machine A and the transporting machine B are unlikely to be overturned and are therefore capable of effecting safe operations.

Figure 16B:
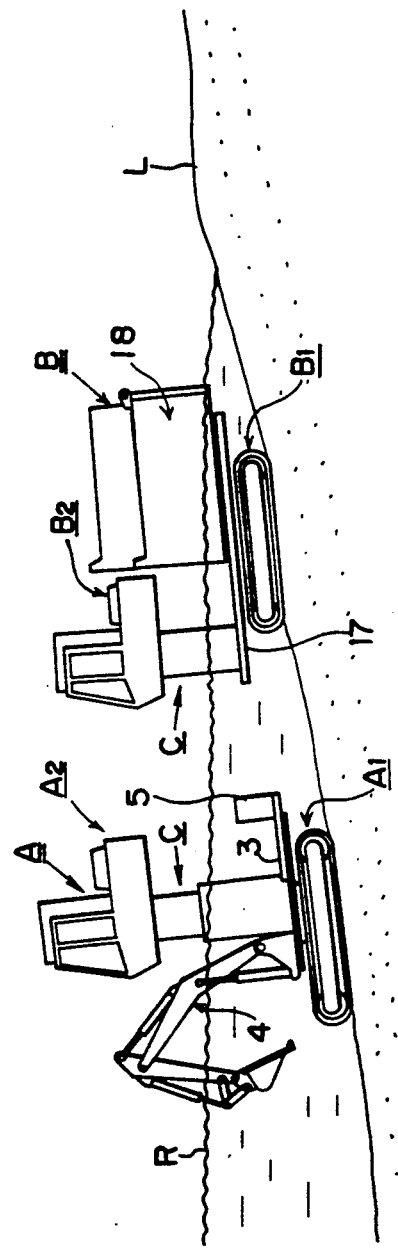

In a case where the extending and retracting body C is interposed between the lower and upper structures $A_1$ and $A_2$ of the working machine A or between the lower and upper structures $B_1$ and $B_2$ of the transporting machine B, the upper structures $A_2$ and $B_2$ are capable of being freely raised or lowered. When the working machine A and the transporting machine B are advanced into the river, the upper structures $A_2$ and $B_2$ can be raised to be located above the water by upwardly extending the extending and retracting body C, as depicted in FIG. 16B.

In addition, when the working machine A and the transporting machine B return to the land L, as the extending and retracting body C in the extended state is made to retract, the upper structures $A_2$ and $B_2$ can be lowered to positions closest to the lower structures $A_1$ and $B_1$. Thus, the working machine A and the transporting machine B can be used on the land L in the same way as conventional land-type machines.

Since the platform 18 is disposed on the swivel base 17 of the lower structure $B_1$ of the transporting machine B, the positions of the platform 18 and the upper structure $B_2$ can be changed by swiveling the swivel base 17 on the lower structure B1 in the operation on the bottom of the water. As a result, operations can be effected very advantageously and safely even in cases where the contours of the bottom of the water are unfavorable and the change of direction by means of the endless-track traveling units 16 of the lower structure B1 is difficult.

In a case where the transporting machine B is provided with the relatively moving means to render the upper structure $B_2$ movable substantially horizontally relative to the platform 18, an advantage is offered in that a positional change in the center of gravity entailed by an increase in the volume of gravel and the like loaded can be controlled as practically as possible, and that the traveling stability can be maintained satisfactorily.

In addition, since the extending and retracting body C has a rectangular configuration whose cross section is polygonal, the extending and retracting body C excels in the shearing characteristic, and is capable of maintaining sufficient strength and of demonstrating a very beneficial effect in complementing the strength of the hydraulic cylinder 11. It should be noted that the cross sectional configuration of the extending and retracting body is not restricted to the above-described configuration and may be formed in, for example, a cylindrical configuration, in which case the use of a detent mechanism is preferable.

Since the tubes 6a are provided with the friction absorbing means, the extending and retracting body C is capable of effecting smooth motion, so that damage of the tubes 6a, which would otherwise occur, can be effectively prevented.

Since the distance between the endless-track traveling units 2, 16 is variable, in a case where the ground at the bottom of the water is soft, the distance therebetween can be set to a maximum dimension, thereby enabling stable traveling and facilitating the excavating operation.

Although an underwater camera is not shown in the drawings and is not described in the above-described embodiments, an appropriate underwater camera may be installed on an outer peripheral portion of the lower structure $A_1$ or $B_1$ or on the boom, thereby making it possible for the operator to control traveling while visually confirming the configuration of the bottom of the water from the operator's cabin.

In addition, the means for causing the upper structure $B_2$ to move substantially horizontally relative to the platform 18 is not restricted the above-described embodiment, and may be substituted by another means capable of effecting a similar operation.

What is claimed is:

1. A working machine for traveling on land and on a bottom of a body of water to excavate a material from the water bottom comprising:
    a traveling lower structure capable of self-traveling and including a base, provided with predetermined traveling means, and a swivel base disposed on said base;
    an upper structure including an operator's chamber for controlling and traveling means, wherein a lower surface of said operator's chamber is in contact with an upper surface side of said swivel base in a retracted position and adapted to extend upwardly of the water body surface in an extended position; and
    means for raising and lowering the upper structure relative to the lower structure, wherein said raising and lowering means includes an extending and retracting body formed from a plurality of tubes having different cross-sectional sizes and fitted one within another, said tubes being disposed to move relative to each other in an axial direction to allow said extending and retracting body to extend or retract telescopically, wherein friction-absorbing means is interposed between adjacent ones of fitted portions of said tubes, and wherein said friction-absorbing means includes bases each secured to upper and lower portions of said tubes and sliding pieces each supported by said bases and formed of a material having a smooth surface.

2. A working machine according to claim 1, further comprising a hydraulic cylinder extending upright from the upper surface of said swivel base and coupled with said upper structure to allow said upper structure through said extending and retracting body to be raised or lowered as a piston rod of said hydraulic cylinder is advanced or retracted.

3. A working machine according to claim 2, an outer periphery of said hydraulic cylinder is surrounded by said extending and retracting body extending between said swivel base and said upper structure.

4. A working machine according to claim 3, wherein said extending and retracting body has a polygonal cross section.

5. A working machine according to claim 1, wherein said traveling means includes a pair of endless tracks, and means for varying a distance between said endless tracks.

6. A working machine according to claim 5, further comprising control means, in said operator's chamber, for controlling the distance between said endless tracks.

7. An excavating system comprising:
    a first working machine including an upper structure having an operator's cabin connected to be supported on a traveling lower structure capable of self-traveling, and a working boom juxtaposed in the vicinity of said upper structure; and
    a second working machine including an upper structure having an operator's cabin connected to be supported on a traveling lower structure capable of self-traveling, and a load-carrying platform juxtaposed in the vicinity of said upper structure on said second working machine,
    wherein the excavation and transportation of a material to be removed are effected by said first and second working machines operated in cooperation with each other.

8. An excavating system according to claim 7, wherein said second working machine includes means for relatively moving said upper structure substantially horizontally relative to said load-carrying platform.

9. An excavating system according to claim 8, wherein said relatively moving means includes a guide fixed on an upper surface of a swivel base of said lower structure, a moving body supported by said guide for advancing and retracting movement along said guide, and a cylinder for driving said moving member to advance or retract said moving member, said upper structure being supported on said moving body.

10. An excavating system according to claim 9, wherein said guide includes a pair of guide rails arranged along a traveling direction of said traveling lower structure, said load-carrying platform being disposed on an upper surface side of said guide rails.

11. An excavating system according to claim 9, wherein a free end of said cylinder is coupled with said moving body.

12. An excavating system according to claim 9, wherein said cylinder is a hydraulic cylinder, and means for controlling said hydraulic cylinder from said operator's cabin.

13. An excavating system according to claim 7, further comprising an extending and retracting body interconnecting the upper structure to the lower structure in each of said first and second working machines, each extending and retracting body including a plurality of tubes having different cross-sectional sizes and fitted one within another and a hydraulic cylinder disposed within said tubes, a free end of said hydraulic cylinder being coupled with one of said tubes which is adapted to be extended to a highest position.

14. An excavating system according to claim 7, further comprising a column of fixed length for connecting the upper structure to the lower structure in each said first and second working machine.

* * * * *